US008755596B2

(12) United States Patent
Datta et al.

(10) Patent No.: US 8,755,596 B2
(45) Date of Patent: Jun. 17, 2014

(54) STUDYING AESTHETICS IN PHOTOGRAPHIC IMAGES USING A COMPUTATIONAL APPROACH

(75) Inventors: Ritendra Datta, State College, PA (US); Jia Li, State College, PA (US); James Z. Wang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 13/542,326

(22) Filed: Jul. 5, 2012

(65) Prior Publication Data

US 2013/0011070 A1 Jan. 10, 2013

Related U.S. Application Data

(63) Continuation of application No. 12/116,578, filed on May 7, 2008, now abandoned.

(60) Provisional application No. 60/916,467, filed on May 7, 2007.

(51) Int. Cl.
*G06K 9/62* (2006.01)

(52) U.S. Cl.
USPC .......................... 382/160; 382/224; 715/968

(58) Field of Classification Search
USPC ................... 382/224, 160; 715/968
See application file for complete search history.

(56) References Cited

U.S. PATENT DOCUMENTS

| 6,816,847 | B1 * | 11/2004 | Toyama ........................ 706/14 |
| 7,194,380 | B2 | 3/2007 | Barrow et al. |
| 7,272,586 | B2 * | 9/2007 | Nauck et al. .................... 706/52 |
| 8,332,429 | B2 | 12/2012 | Poirier et al. |
| 8,508,622 | B1 | 8/2013 | Anon |
| 2002/0070945 | A1 * | 6/2002 | Kage ............................ 345/581 |
| 2002/0120619 | A1 | 8/2002 | Marso et al. |
| 2012/0177248 | A1 | 7/2012 | Shuster |

OTHER PUBLICATIONS

Datta, R.et al., Learning the Consensus on Visual Quality for Next-Generation Image Management, Proceedings of the ACM Multimedia Conference, pp. 533-536, ACM, Augsburg, Germany, Sep. 2007.
Datta, R. et al., Studying Aesthetics in Photographic Images Using a Computational Approach, 9th European Conference on Computer Vision, May 2006.
Ke, Y., et al., The Design of High-Level Features for Photo Quality Assessment, *Proc. CVPR* 2006.
Ke, Y. et al., The Design of High-Level Features for Photo Quality Assessment, *2006 IEEE Computer Society Conference on Computer Vision and Pattern Recognition*, 1:. 419-426.

* cited by examiner

*Primary Examiner* — Kathleen Y Dulaney
(74) *Attorney, Agent, or Firm* — Gifford, Krass, Sprinkle, Anderson & Citkowski, P.C.

(57) ABSTRACT

The aesthetic quality of a picture is automatically inferred using visual content as a machine learning problem using, for example, a peer-rated, on-line photo sharing Website as data source. Certain visual features of images are extracted based on the intuition that they can discriminate between aesthetically pleasing and displeasing images. A one-dimensional support vector machine is used to identify features that have noticeable correlation with the community-based aesthetics ratings. Automated classifiers are constructed using the support vector machines and classification trees, with a simple feature selection heuristic being applied to eliminate irrelevant features. Linear regression on polynomial terms of the features is also applied to infer numerical aesthetics ratings.

9 Claims, 14 Drawing Sheets

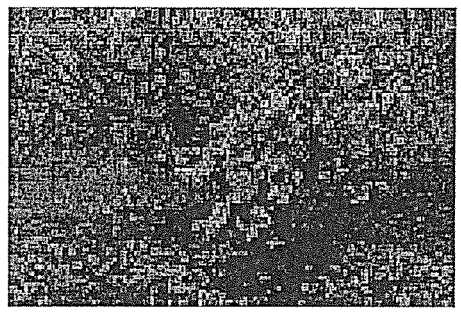
FIGURE 3A  FIGURE 3B
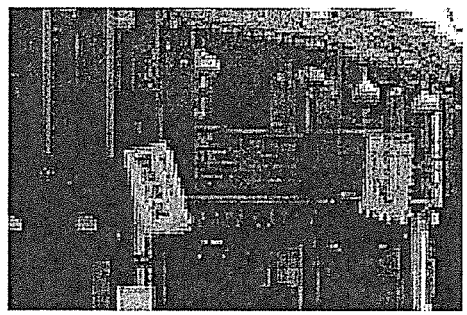
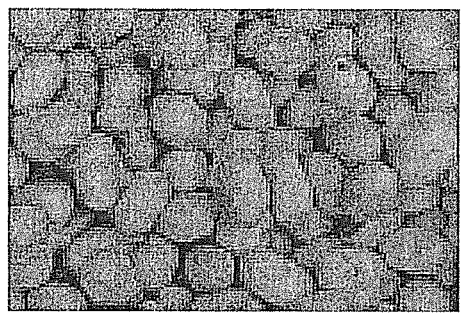
FIGURE 3C  FIGURE 3D

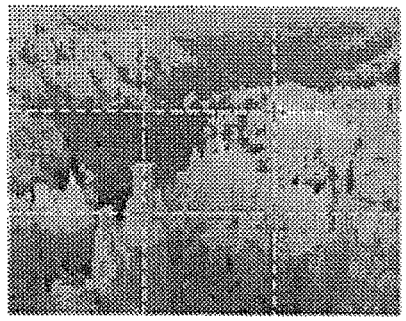
FIGURE 4A         FIGURE 4B
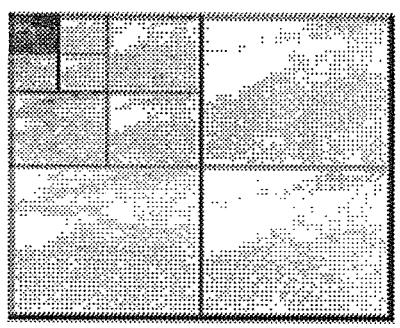
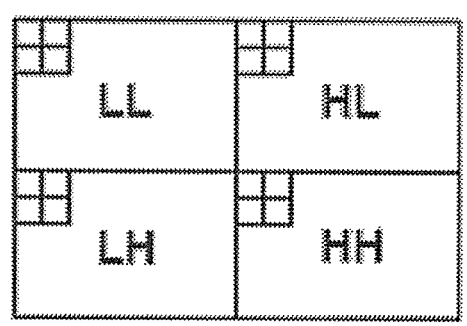
FIGURE 4C         FIGURE 4D
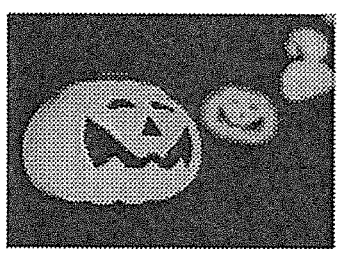
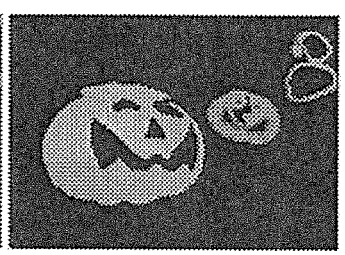
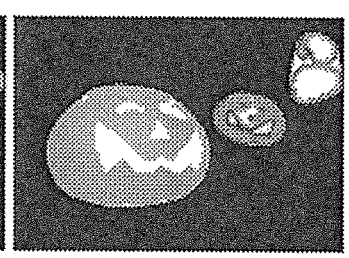
FIGURE 6A         FIGURE 6B         FIGURE 6C

STUDYING AESTHETICS IN PHOTOGRAPHIC IMAGES USING A COMPUTATIONAL APPROACH

REFERENCE TO RELATED APPLICATIONS

This application is a continuation of U.S. patent application Ser. No. 12/116,578, filed May 7, 2008, which claims priority from U.S. Provisional Patent Application Ser. No. 60/916,467, filed May 7, 2007, the entire content of both of which is incorporated herein by reference.

GOVERNMENT SPONSORSHIP

This invention was made with government support under Grant No. 0347148, awarded by The National Science Foundation. The Government has certain rights in the invention.

FIELD OF THE INVENTION

This invention relates generally to digital image analysis and, in particular, to automatically inferring aesthetic quality of pictures based upon visual content

BACKGROUND OF THE INVENTION

Photography is defined as the art or practice of taking and processing photographs. Aesthetics in photography is how people usually characterize beauty in this form of art. There are various ways in which aesthetics is defined by different people. There exists no single consensus on what it exactly pertains to. The broad idea is that photographic images that are pleasing to the eyes are considered to be higher in terms of their aesthetic beauty. What pleases or displeases one person may be different from what pleases or displeases another person. While the average individual may simply be interested in how soothing a picture is to the eyes, a photographic artist may be looking at the composition of the picture, the use of colors and light, and any additional meanings conveyed by the picture. A professional photographer, on the other hand, may be wondering how difficult it may have been to take or to process a particular shot, the sharpness and the color contrast of the picture, or whether the "rules of thumb" in photography have been maintained. All these issues make the measurement of aesthetics in pictures or photographs extremely subjective.

Content analysis in photographic images has been studied by the multimedia and vision research community in the past decade. Today, several efficient region-based image retrieval engines are in use [13, 6, 21, 18]. Statistical modeling approaches have been proposed for automatic image annotation [4, 12]. Culturally significant pictures are being archived in digital libraries [7]. Online photo sharing communities are becoming more and more common [1, 3, 11, 15]. In this age of digital picture explosion, it is critical to continuously develop intelligent systems for automatic image content analysis. The advantages of such systems can be reaped by the scientific community as well as common people.

Community-Based Photo Ratings as Data Source

One good data source is a large on-line photo sharing community, Photo.net, possibly the first of its kind, started in 1997 by Philip Greenspun, then a researcher on online communities at MIT [15]. Primarily intended for photography enthusiasts, the Website attracts more than 400,000 registered members. Many amateur and professional photographers visit the site frequently, share photos, and rate and comment on photos taken by peers. There are more than one million photographs uploaded by these users for perusal by the community. Of interest to us is the fact that many of these photographs are peer-rated in terms of two qualities, namely aesthetics and originality. The scores are given in the range of one to seven, with a higher number indicating better rating. This site acts as the main source of data for our computational aesthetics work. The reason we chose such an online community is that it provides photos which are rated by a relatively diverse group. This ensures generality in the ratings, averaged out over the entire spectrum of amateurs to serious professionals.

While amateurs represent the general population, the professionals tend to spend more time on the technical details before rating the photographs. This is evident from the comments that are posted by peers on photographs, often in an attempt to justify their ratings. Because this is a photo sharing community, there can be some bias towards the opinions of professional photographers over the general population, but this is not critical since opinions of professionals often reflect on what satisfies their customers on an average. Hence, such ratings may be used as indicators of aesthetics in photography, but with a caveat: the nature of any peer-rated community is such that it leads to unfair judgments under certain circumstances, and Photo.net is no exception, making acquired data fairly noisy. Ideally, the data should have been collected from a random sample of human subjects under controlled setup, if resource constraints so allow.

By definition, Aesthetics means (1) "concerned with beauty and art and the understanding of beautiful things", and (2) "made in an artistic way and beautiful to look at". A more specific discussion on the definition of aesthetics can be found in [16]. As can be observed, no consensus was reached on the topic among the users, many of whom are professional photographers. Originality has a more specific definition of being something that is unique and rarely observed. The originality score given to some photographs can also be hard to interpret, because what seems original to some viewers may not be so for others. Depending on the experiences of the viewers, the originality scores for the same photo can vary considerably. Thus the originality score is subjective to a large extent as well. Even then, the reasons that hold for aesthetics ratings also hold for originality, making this data a fairly general representation of the concept of originality and hence safe to use for statistical learning purposes.

SUMMARY OF THE INVENTION

This invention is directed to automatically inferring aesthetic quality of pictures using their visual content as a machine learning problem. The preferred embodiment uses a peer-rated, on-line photo sharing Website as data source.

In accordance with the method, certain visual features of images are extracted based on the intuition that they can discriminate between aesthetically pleasing and displeasing images. A one-dimensional support vector machine is used to identify features that have noticeable correlation with the community-based aesthetics ratings. Automated classifiers are constructed using the support vector machines and classification trees, with a simple feature selection heuristic being applied to eliminate irrelevant features. Linear regression on polynomial terms of the features is also applied to infer numerical aesthetics ratings.

In broad and general terms, one or more software operations are performed on a digitized image to automatically extract a plurality of visual features representative of the image, and one or more of the visual features are used to classify the image, rate the image, select the image, eliminate the image, or compose the image.

To train the system, a plurality of digitized images are received along with aesthetic-based ratings of the images provided by viewers thereof. One or more software operations are performed on the images to identify those features which correlate to the aesthetic-based ratings provided by the viewers, the features which correlate to the viewer ratings are stored to classify rate select eliminate provide assistance in adjusting the composition of the new images being characterized.

To assist in feature extraction, the images are preferably converted into the HSV color space to produce two-dimensional matrices IH, IS and IV. The image may be segmented to identify objects in the image. The extracted features may include exposure, color distribution, saturation or hue, the rule of thirds, viewer familiarity with the image, graininess or smoothness, image size or aspect ratio, depth-of-field, or shapes within the image.

The system and method offer numerous potential benefits. When low-level image features can be used to infer the aesthetics ratings that an image deserves, the result can be used by photographers to get a rough estimate of their shot composition quality, leading to adjustment in camera parameters or shot positioning for improved aesthetics. Camera manufacturers may incorporate a "suggested composition" feature into their products. Alternatively, a content-based image retrieval (CBIR) system can use the aesthetics score to discriminate between visually similar images, giving greater priority to more pleasing query results. Biologically speaking, a reasonable solution to this problem can lead to a better understanding of human vision.

BRIEF DESCRIPTION OF THE DRAWINGS

FIGS. 3A and 3B show a proposed colorfulness measure with high values;

FIGS. 3C and 3D show a proposed colorfulness measure with low values;

FIG. 4A shows an original image to demonstrate the rule of thirds in photography;

FIGS. 4B and 4C show an example of a transform on the intensity band;

FIG. 4D shows an arrangement of three bands LH, HL and HH of the coefficients;

FIG. 6A demonstrates the shape convexity feature of the original photograph;

FIG. 6B demonstrates the shape convexity feature with the three largest non-background segments shown in original color;

FIG. 6C demonstrates the shape convexity feature with the exclusive regions of the convex hull generated for each segment shown in white;

DETAILED DESCRIPTION OF THE INVENTION

In spite of the ambiguous definition of aesthetics, this invention shows that there does exist certain visual properties which make photographs, in general, more aesthetically beautiful. We tackle the problem computationally and experimentally through a statistical learning approach. This allows us to reduce the influence of exceptions and to identify certain features which are statistically significant in good quality photographs. Our results and findings could be of interest to the scientific community, as well as to the photographic art community and manufacturers for image capturing devices.

Figure 1:
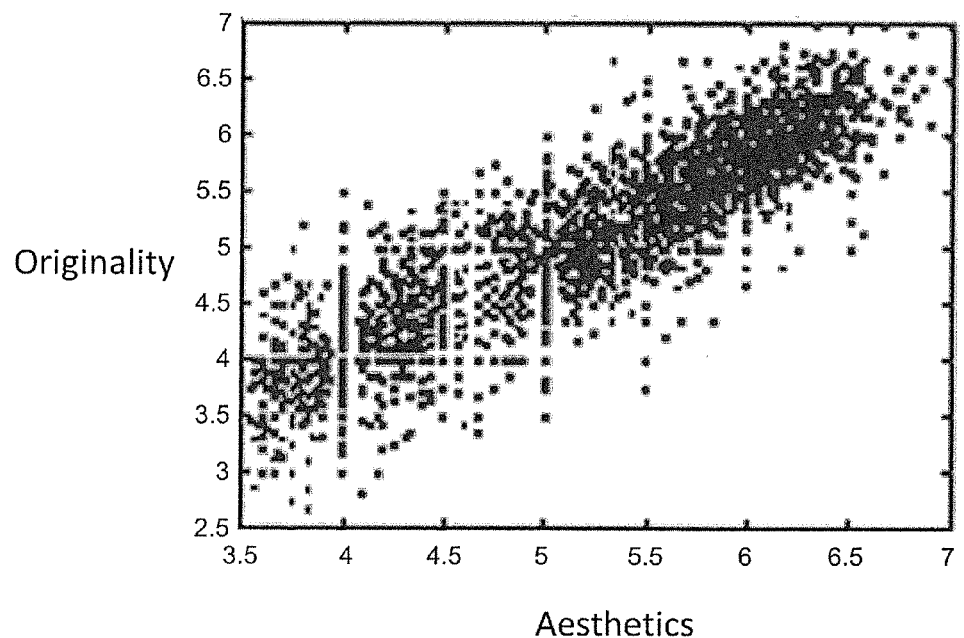
FIG. 1 shows the correlation between the aesthetics and originality ratings for 3581 photographs.

We downloaded those pictures and their associated metadata which were rated by at least two members of the community. In order not to over-distract the normal services provided by the site, we downloaded the data slowly and over a long-period of time for our research. For each image downloaded, we parsed the pages and gathered the following information: (1) average aesthetics score between 1.0 and 7.0, (2) average originality score between 1.0 and 7.0, (3) number of times viewed by members, and (4) number of peer ratings One of the first observations made on the gathered data was the strong correlation between the aesthetics and originality ratings for a given image. A plot of 3581 unique photograph ratings can be seen in FIG. 1. As can be seen, aesthetics and originality ratings have approximately linear correlation with each other. This can be due to a number of factors. Many users quickly rate a batch of photos in a given day. They tend not to spend too much time trying to distinguish between these two parameters when judging a photo. They more often than not rate photographs based on a general impression. Typically, a very original concept leads to good aesthetic value, while beauty can often be characterized by originality in view angle, color, lighting, or composition. Also, because the ratings are averages over a number of people, disparity by individuals may not be reflected as high in the averages. Hence there is generally not much disparity in the average ratings. In fact, out of the 3581 randomly chosen photos, only about 1.1% have a disparity of more than 1.0 between average aesthetics and average originality, with a peak of 2.0.

Figure 2:
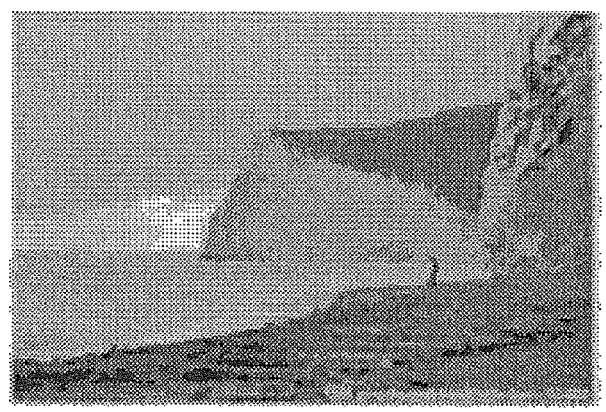
FIG. 2 shows how aesthetics scores can be significantly influenced by semantics.

As a result of this observation, we chose to concentrate on aesthetics ratings, since the value of one can be approximated to the value of the other, and among the two, aesthetics has a rough definition that in principle depends somewhat less on the content or the semantics of the photograph, something that is very difficult for present day machine intelligence to interpret accurately. Nonetheless, the strong dependence on originality ratings mean that aesthetics ratings are also largely influenced by the semantics. As a result, some visually similar photographs are rated very differently. For example in FIG. 2, loneliness is depicted using a man in each frame, increasing its appeal, while the lack of the person makes the photographs uninteresting and is likely causing poorer ratings from peers. This makes the task of automatically determining aesthetics of photographs highly challenging.

Our Computational Aesthetics Approach

Our desire is to take the first step in understanding what aspects of a photograph appeal to people, from a population and statistical stand-point. For this purpose, we use (1) a classifier that can qualitatively distinguish between pictures of high and low aesthetic value, or (2) a regression model that can quantitatively predict the aesthetics score (i.e., predicting the absolute rating). Both approaches relying on low-level visual features only. We define high or low in terms of pre-defined ranges of aesthetics scores.

There are reasons to believe that classification may be a more appropriate model than regression in tackling this problem. For one, the measures are highly subjective, and there are no agreed standards for rating. This may render absolute scores less meaningful. Again, ratings above or below certain thresholds on an average by a set of unique users generally reflect on the photograph's quality. This way we also get around the problem of consistency where two identical photographs can be scored differently by different groups of people. However, it is more likely that both the group averages are within the same range and hence are treated fairly when posed as a classification problem.

On the other hand, the 'ideal' case is when a machine can replicate the task of robustly giving images aesthetics scores in the range of (1.0-7.0) the humans do. This is the regression formulation of the problem. Nevertheless, we describe both classification and regression models on the data.

Visual Feature Extraction

Experiences with photography leads us to believe in certain aspects as being critical to quality. We treat each downloaded image separately and extract features from them. We use the following notation: The RGB data of each image is converted to HSV color space, producing two-dimensional matrices IH, IS, and IV, each of dimension X×Y. In photography and color psychology, color tones and saturation play important roles, and hence working in the HSV color space makes computation more convenient. For some features we extract information from objects within the photographs.

An approximate way to find objects within images is segmentation, under the assumption that homogeneous regions correspond to objects. We use a fast segmentation method based on clustering. For this purpose the image is transformed into the LUV space, since in this space locally Euclidean distances model the perceived color change well. Using a fixed threshold for all the photographs, we use the K-Center algorithm to compute cluster centroids, treating the image pixels as a bag of vectors in LUV space. With these centroids as seeds, a K-means algorithm computes clusters. Following a connected component analysis, color-based segments are obtained. The five largest segments formed are retained and denoted as $\{s1, \ldots, s5\}$. These clusters are used to compute region-based features as discussed elsewhere herein.

We extracted 56 visual features for each image in an empirical fashion, based on (a) our own intuitions, (b) comments posted by peers on a large collection of high and low rated pictures, and (c) ease of interpretation of results. The feature set was carefully chosen but limited because our goal was mainly to study the trends or patterns, if any, that lead to higher or lower aesthetics ratings. If the goal was to only build a strong classifier or regression model, it would have made sense to generate exhaustive features and apply typical machine-learning techniques such as boosting. Without meaningful features it is difficult to make meaningful conclusions from the results. We refer to our features as candidate features and denote them as $F=\{f_i|1\le i\le 56\}$ which are described as follows.

Exposure of Light and Colorfulness

Measuring the brightness using a light meter and a gray card, controlling the exposure using the aperture and shutter speed settings, and darkroom printing with dodging and burning are basic skills for any professional photographer. Too much exposure (leading to brighter shots) often yields lower quality pictures. Those that are too dark are often also not appealing. Thus light exposure can often be a good discriminant between high and low quality photographs. Note that there are always exceptions to any "rules of thumb". An over-exposed or under-exposed photograph under certain scenarios may yield very original and beautiful shots. Therefore it is prudent to not expect or depend too much on individual features. Ideally, the use of light should be characterized as normal daylight, shooting into the sun, backlighting, shadow, night etc. We use the average pixel intensity $$f_1 = \frac{1}{XY}\sum_{x=0}^{X-1}\sum_{y=0}^{Y-1} I_V(x, y)$$

to characterize the use of light.

We prefer a fast and robust method to compute relative color distribution, distinguishing multi-colored images from monochromatic, sepia or simply low contrast images. We use the Earth Mover's Distance (EMD) [17], which is a measure of similarity between any two weighted distributions. We divide the RGB color space into 64 cubic blocks with four equal partitions along each dimension, taking each such cube as a sample point. Distribution D1 is generated as the color distribution of a hypothetical image such that for each of 64 sample points, the frequency is 1/64. Distribution D2 is computed from the given image by finding the frequency of occurrence of color within each of the 64 cubes. The EMD measure requires that the pair wise distance between sampling points in the two distributions be supplied. Since the sampling points in both of them are identical, we compute the pair wise Euclidean distances between the geometric centers $c_i$ of each cube i, after conversion to LUV space. Thus the colorfulness measure f2 is computed as follows: $f2=emd(D1, D2, \{d(a,b)|0\le a,b\le 63\})$, where $d(a,b)=\|rgb2luv\}(ca)-rgb2luv\}(cb)\|$.

The distribution D1 can be interpreted as the ideal color distribution of a 'colorful' image. How similar the color distribution of an arbitrary image is to this one is a rough measure of how colorful that image is. Examples of images producing high and low values of f2 are shown in FIG. 3A to 3D.

Saturation and Hue

Saturation indicates chromatic purity. Pure colors in a photo tend to be more appealing than dull or impure ones. In natural outdoor landscape photography, professionals use specialized film such as the Fuji Velvia to enhance the saturation to result in deeper blue sky, greener grass, more vivid flowers, etc. We compute the saturation indicator as the average saturation $$f_3 = \frac{1}{XY}\sum_{x=0}^{X-1}\sum_{y=0}^{Y-1} I_S(x, y)$$

as the saturation indicator. Hue is similarly computed averaged over IH to get feature f4, though the interpretation of such a feature is not as clear as the former. This is because hue as defined in the HSV space corresponds to angles in a color wheel. Nonetheless, it is included as f4 as a candidate feature.

The Rule of Thirds

A very popular rule of thumb in photography is the Rule of Thirds. The rule can be considered as a sloppy approximation to the 'golden ratio' (about 0.618), a visualization proportion discovered by the ancient Greeks. It specifies that the main element, or the center of interest, in a photograph should lie at one of the four intersections as shown in FIG. 4A. Browsing through a large number of professional photographs it was observed that most of those that follow this rule have the main object stretch from an intersection up to the center of the image. Also noticed was the fact that centers of interest, e.g., the eye of a man, were often placed aligned to one of the edges, on the inside. This implies that a large part of the main object often lies on the periphery or inside of the inner rectangle. Based on these observations, we computed the average hue as $$f_5 = \frac{9}{XY} \sum_{x=X/3}^{2X/3} \sum_{y=Y/3}^{2Y/3} I_H(x, y)$$

with f6 and f7 being similarly computed for IS and IV respectively. Although it may seem redundant to use as feature vectors the average saturation and intensity once for the whole image and once for the inner third, the latter may often pertain exclusively to the main object of interest within the photograph, and hence can potentially convey different kind of information.

Familiarity Measure

Humans learn to rate the aesthetics of pictures from the experience gathered by seeing other pictures. Our opinions are often governed by what we have seen in the past. Because of our curiosity, when we see something unusual or rare we perceive it in a way different from what we get to see on a regular basis. In order to capture this factor in human judgment of photography, we define a new measure of familiarity based on the integrated region matching (IRM) image distance [21]. The IRM distance computes image similarity by using color, texture and shape information from automatically segmented regions, and performing a robust region-based matching with other images. Primarily meant for image retrieval applications, we use it here to quantify familiarity. Given a pre-determined anchor database of images with a well-spread distribution of aesthetics scores, we retrieve the top K closest matches in it with the candidate image as query. Denoting IRM distances of the top matches for each image in decreasing order of rank as $\{q(i)|1\leq i\leq K\}$. We compute f8 and f9 as $$f_8 = \frac{1}{20}\sum_{i=1}^{20} q(i), f_9 = \frac{1}{100}\sum_{i=1}^{100} q(i).$$

In effect, these measures should yield higher values for uncommon images (in terms of their composition). Two different scales of 20 and 100 top matches are used since they may potentially tell different stories about the uniqueness of the picture. While the former measures average similarity in a local neighborhood, the latter does so on a more global basis. Because of the strong correlation between aesthetics and originality, it is intuitive that a higher value of f8 or f9 corresponds to greater originality and hence we expect greater aesthetics score.

Wavelet-Based Texture

Graininess or smoothness in a photograph can be interpreted in different ways. If as a whole it is grainy, one possibility is that the picture was taken with a grainy film or under high ISO settings. If as a whole it is smooth, the picture can be out-of-focus, in which case it is in general not pleasing to the eye. Graininess can also indicate the presence/absence and nature of texture within the image.

The use of texture is a composition skill in photography. One way to measure spatial smoothness in the image is to use Daubechies wavelet transform [10], which has often been used in the literature to characterize texture. We perform a three-level wavelet transform on all three color bands IH, IS and IV. An example of such a transform on the intensity band is shown in FIGS. 4B and 4C. The three levels of wavelet bands are arranged from top left to bottom right in the transformed image, and the four coefficients per level, LL, LH, HL, and HH are arranged as shown in FIG. 4D. Denoting the coefficients (except LL) in level i for the wavelet transform on hue image IH as $w_i^{hh}$, $w_i^{hl}$ and $w_i^{lh}$, i={1, 2, 3} we define features f10, f11 and f12 as follows:

$$f_{i+9} = \frac{1}{S_i}\left\{\sum_x\sum_y w_i^{hh}(x, y) + \sum_x\sum_y w_i^{hl}(x, y) + \sum_x\sum_y w_i^{lh}(x, y)\right\}$$

where $S_k = |w_i^{hh}| + |w_i^{hl}| + |w_i^{hh}|$ and i=1, 2, 3. The corresponding wavelet features for saturation (IS) and intensity images (Iv) images are computed similarly to get f13 through f15 and f16 through f18 respectively. Three more wavelet features are derived. The sum of the average wavelet coefficients over all three frequency levels for each of H, S and V are taken to form three additional features: $f_{19}=\Sigma_{i=10}^{12} f_i$, $f_{20}=\Sigma_{i=13}^{15} f_i$, and $f_{21}=\Sigma_{i=16}^{18} f_i$.

Size and Aspect Ratio

The size of an image has a good chance of affecting the photo ratings. Although scaling is possible in digital and print media, the size presented initially must be agreeable to the content of the photograph. A more crucial parameter is the aspect ratio. It is well-known that 4:3 and 16:9 aspect ratios, which approximate the 'golden ratio,' are chosen as standards for television screens or 70 mm movies, for reasons related to viewing pleasure. The 35 mm film used by most photographers has a ratio of 3:2 while larger formats include ratios like 7:6 and 5:4. While size feature f22=X+Y, the aspect ratio feature $$f23 = 423 = \frac{x}{y}.$$

Region Composition

Segmentation results in rough grouping of similar pixels, which often correspond to objects in the scene. We denote the set of pixels in the largest five connected components or patches formed by the segmentation process described before as $\{s1, \ldots s5\}$. The number of patches t≤5 which satisfy $$|si| \geq \frac{XY}{100}$$

denotes feature f24. The number of color-based clusters formed by K-Means in the LUV space is feature f25. These two features combine to measure how many distinct color blobs and how many disconnected significantly large regions are present.

We then compute the average H, S and V values for each of the top 5 patches as features f26 through f30, f31 through f35 and f36 through f40 respectively. Features f41 through f45 store the relative size of each segment with respect to the image, and are computed as fi+40=|si|/(XY) where i=1, ..., 5.

Figure 5:
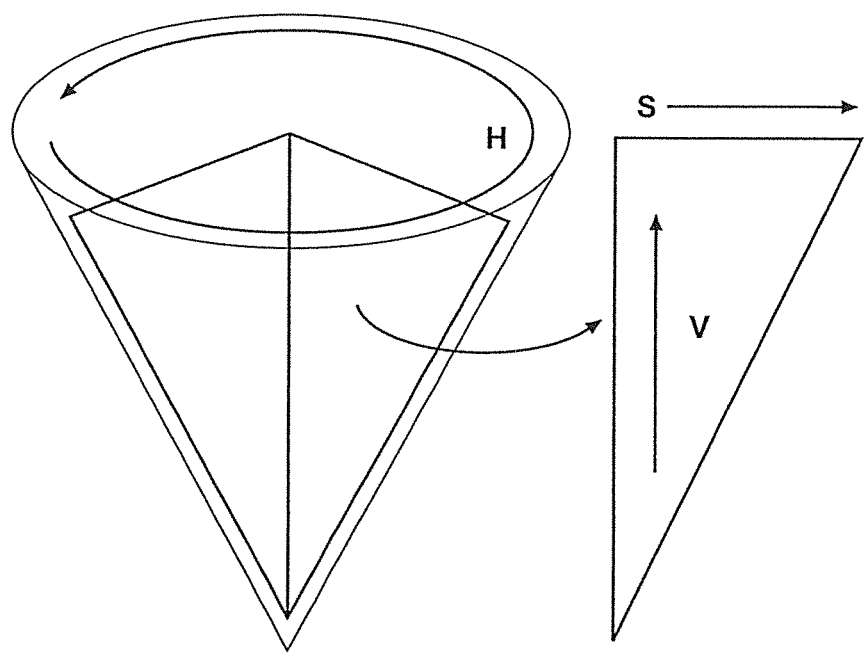
FIG. 5 shows the HSV color wheel.

The hue component of HSV is such that the colors that are 180° apart in the color circle (FIG. 5) are complimentary to each other, which means that they add up to 'white' color. These colors tend to look pleasing together. Based on this idea, we define two new features, f46 and f47 in the following manner, corresponding to average color spread around the wheel and average complimentary colors among the top 5 patch hues.

$$f_{46} = \sum_{i=1}^{5} \sum_{j=1}^{5} |h_i - h_j|, f_{47} = \sum_{i=1}^{5} \sum_{j=1}^{5} l|h_i - h_j|,$$

$$h_i = \sum_{(x,y) \in s_i} I_H(x, y),$$

where l(k)=k if k≤180°, 360°−k if k>180°. Finally, the rough positions of each segment are stored as features f48 through f52. We divide the image into 3 equal parts along horizontal and vertical directions, locate the block containing the centroid of each patch si, and set f47+i=(10r+c) where (r,c)∈{(1,1), ..., (3,3)} indicates the corresponding block starting with top-left.

Low Depth of Field Indicators

Pictures with a simplistic composition and a well-focused center of interest are sometimes more pleasing than pictures with many different objects. Professional photographers often reduce the depth of field (DOF) for shooting single objects by using larger aperture settings, macro lenses, or telephoto lenses. DOF is the range of distance from a camera that is acceptably sharp in the photograph. On the photo, areas in the DOF are noticeably sharper.

By browsing the images and ratings, we noticed that a large number of low DOF photographs, e.g., insects, other small creatures, animals in motion, were given high ratings. One reason may be that these shots are difficult to take, since it is hard to focus steadily on small and/or fast moving objects like insects and birds. A common feature is that they are taken either by macro or by telephoto lenses. We propose a novel method to detect low DOF and macro images. We divide the image into 16 equal rectangular blocks {M1, ... M16}, numbered in row-major order. Let w3={$w_3^{lh}$, $w_3^{hl}$, $w_3^{hh}$} denote the set of wavelet coefficients in the high-frequency (level 3 by the notation in Sec. 2.5) of the hue image IH. The low depth of field indicator feature f53 for hue is computed as follows, with f54 and f55 being computed similarly for IS and IV respectively:

$$f_{53} = \frac{\sum_{(x,y) \in M_6 \cup M_7 \cup M_{10} \cup M_{11}} w_3(x, y)}{\sum_{i=1}^{16} \sum_{(x,y) \in M_4} w_3(x, y)}$$

The idea here is that the object of interest in a macro shot is usually near the center, where there is sharp focus, while the surrounding is usually out of focus due to low DOF. This essentially means that a large value of the low DOF indicator features tend to occur for macro and telephoto shots.

Shape Convexity

All of the previously discussed features were either related to color, composition, or texture. It is believed that shapes in a picture also influence the degree of aesthetic beauty perceived by humans. The challenge in designing a shape feature lies in the understanding of what kind of shape pleases humans, and whether any such measure generalizes well enough or not. As always, we hypothesize that convex shapes (perfect moon, well-shaped fruits, boxes, windows etc.) have an appeal (positive or negative) different from concave or highly irregular shapes. Let the image be segmented, as described before, and R patches {p1, ..., pR} are obtained such that $$|p_k| \geq \frac{XY}{200}.$$

For each pk, we compute its convex hull, denoted by g(pk). For a perfectly convex shape, $$p_k \cap g(p_k) = p_k, i.e. \frac{|p_k|}{|g(p_k)|} = 1.$$

Allowing some room for irregularities of edge and error due to digitization, we define the shape convexity feature as follows:

$$f_{56} = \frac{1}{XY} \left\{ \sum_{k=1}^{R} I\left(\frac{|p_k|}{|g(p_k)|} \geq 0.8\right) |p_k| \right\}$$

where I(.) is the indicator function. This feature can be interpreted as the fraction of the image covered by approximately convex-shaped homogeneous regions, ignoring the insignificant image regions. This feature is demonstrated in FIGS. 6A-6C. Note that a critical factor here is the segmentation process, since we are characterizing shape by segments. Often, a perfectly convex object is split into concave or irregular parts, considerably reducing the reliability of this measure.

Feature Selection, Classification, and Regression

A contribution of our work is the feature extraction process itself, since each of the features represent interesting aspects of photography regardless of how they aid in classification or regression. We now wish to select interesting features in order to (1) discover features that show correlation with community-based aesthetics scores, and (2) build a classification/regression model using a subset of strongly/weakly relevant features such that generalization performance is near optimal. Instead of using any regression model, we use a one-dimensional support vector machine (SVM) [20]. SVMs are essentially powerful binary classifiers that project the data space into higher dimensions where the two classes of points are linearly separable. Naturally, for one-dimensional data, they can be more flexible than a single threshold classifier.

For the 3581 images downloaded, all 56 features in $\mathcal{F}$ were extracted and normalized to the [0,1] range to form the experimental data. Two classes of data are chosen, high containing samples with aesthetics scores greater than 5.8, and low with scores less than 4.2. Note that as mentioned before, only those images that were rated by at least two unique members were used. The reason for choosing classes with a gap is that pictures with close lying aesthetic scores, e.g., 5.0 and 5.1 are not likely to have any distinguishing feature, and may merely be representing the noise in the whole peer-rating process. For all experiments we ensure equal priors by replicating data to generate equal number of samples per class. A total of 1664 samples is thus obtained, forming the basis for our classification experiments.

We perform classification using the standard RBF Kernel ($\gamma$=3.7, cost=1.0) using the LibSVM package 9. SVM is run 20 times per feature, randomly permuting the data-set each time, and using a 5-fold cross-validation (5-CV). The top 15 among the 56 features in terms of model accuracy are obtained. The stability of these single features as classifiers are also tested. We then proceeded to build a classifier that can separate low from high. For this, we use SVM as well as the classification and regression trees (CART) algorithm, developed at Stanford and Berkeley [8]. While SVM is a powerful classifier, one limitation is that when there are too many irrelevant features in the data, the generalization performance tends to suffer. Hence the problem of feature selection continues to dwell. Feature selection for classification purposes is a well-studied topic [5], with some recent work related specifically to feature selection for SVMs. Filter-based methods and wrapper-based methods are two broad techniques for feature selection. While the former eliminates irrelevant features before training the classifier, the latter chooses features using the classifier itself as an integral part of the selection process. In this work, we combine these two methods to reduce computational complexity while obtaining features that yield good generalization performance: (1) The top 30 features in terms of their one-dimensional SVM performance methods are retained while the rest of the features are filtered out. (2) We use forward selection, a wrapper-based approach in which we start with an empty set of features and iteratively add one feature at a time that increases the 5-fold CV accuracy the most. We stop at 15 iterations (i.e. 15 features) and use this set to build the SVM-based classifier.

Although SVM produced very encouraging classification results, they were hard to interpret, except for the one-dimensional case. Classifiers that help understand the influence of different features directly are tree-based approaches such as CART. We used the recursive partitioning (RPART) implementation [19], developed at Mayo Foundation, to build a two-class classification tree model for the same set of 1664 data samples. Finally, we perform linear regression on polynomial terms of the features values to see if it is possible to directly predict the aesthetics scores in the 1 to 7 range from the feature vector. The quality of regression is usually measured in terms of the residual sum-of-squares error $$R_{res}^2 = \frac{1}{N-1} \sum_{i=1}^{N} (Y_i - \hat{Y}_i)^2$$

where $\hat{Y}_i$ is the predicted value of Yi. Here Y being the aesthetics scores, in the worst case $\overline{Y}$ is chosen every time without using the regression model, yielding $R_{res}^2 = \sigma^2$ (variance of Y). Hence, if the independent variables explain something about Y, it must be that $R_{res} \leq \sigma^2$. For this part, all 3581 samples are used, and for each feature $f_i$, the polynomials $$\left(f_i, f_i^2, f_i^3, f_i^{\frac{1}{3}}, \text{ and } f_i^{\frac{2}{3}}\right)$$

are used as independent variables.

Experimental Results

For the one-dimensional SVM performed on individual features, the top 15 results obtained in decreasing order of 5-CV accuracy are as follows: ($f_{31}$, $f_1$, $f_6$, $f_{15}$, $f_9$, $f_8$, $f_{32}$, $f_{10}$, $f_{55}$, $f_3$, $f_{36}$, $f_{16}$, $f_{54}$, $f_{48}$, $f_{22}$). The maximum classification rate achieved by any single feature was $f_{31}$ with 59.3%. This is not surprising since one feature is not expected to distinguish between high and low aesthetics scores, but having accuracy greater than 54%, they act as weak classifiers and hence show some correlation with the aesthetics scores. Also note that when the number of ratings required per class exceeds 5, the sample sizes decreases (due to availability of data), affecting the accuracy rates.

Coming to the SVM results, the combined filter and wrapper method for feature selection yielded the following set of 15 features: ($f_{31}$, $f_1$, $f_{54}$, $f_{28}$, $f_{43}$, $f_{25}$, $f_{22}$, $f_{17}$, $f_{15}$, $f_{20}$, $f_2$, $f_9$, $f_{21}$, $f_{23}$, $f_6$). The accuracy achieved with just these 15 features is 70.12%, with precision of detecting high class being 68.08%, and low class being 72.31%. Considering the nature of this problem, these classification results are indeed promising.

Figure 7A:
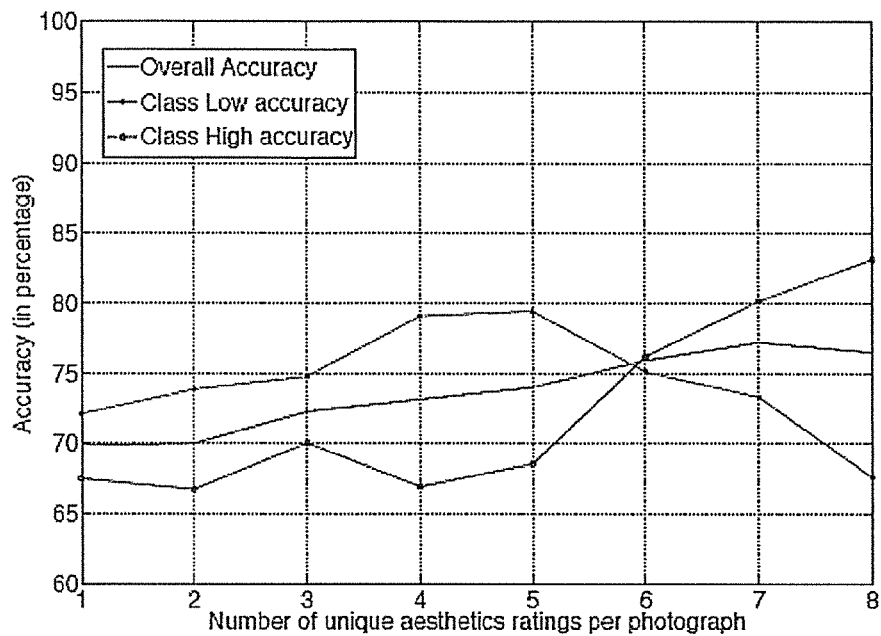
FIG. 7A shows a variation 5-CV SVM accuracy with the minimum number of unique ratings per picture.
Figure 7B:
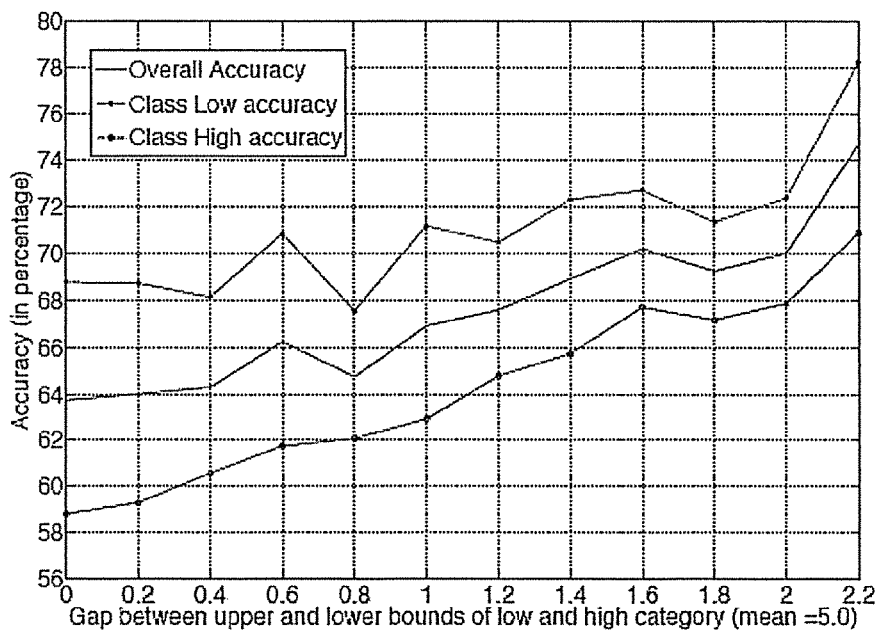
FIG. 7B shows a variation of 5-CV SVM accuracy with inter-class gap δ.

The stability of these classification results in terms of number of ratings are then considered. Samples are chosen in such a way that each photo is rated by at least K unique users, K varying from 1 to 8, and the 5-CV accuracy and precision plotted, as shown in FIG. 7A. It is observed that accuracy values show an upward trend with increasing number of unique ratings per sample, and stabilize somewhat when this value touches 5. This reflects on the peer-rating process—the inherent noise in this data gets averaged out as the number of ratings increase, converging towards a somewhat 'fair' score. We then experimented with how accuracy and precision varied with the gap in aesthetics ratings between the two classes high and low. So far we have considered ratings$\geq$5.8 as high and $\leq$4.2 as low. In general, considering that $\geq$5.8 as high and $\leq$4.2 as low, we have based all classification experiments on $\delta$=1.6. The value 5.0 is chosen as it is the median aesthetics rating over the 3581 samples. We now vary $\delta$ while keeping all other factors constant, and compute SVM accuracy and precision for each value. These results are plotted in FIG. 7B. Not surprisingly, the accuracy increases as $\delta$ increases. This is accounted by the fact that as $\delta$ increases, so does the distinction between the two classes and hence it becomes easier to separate them.

Figure 8:
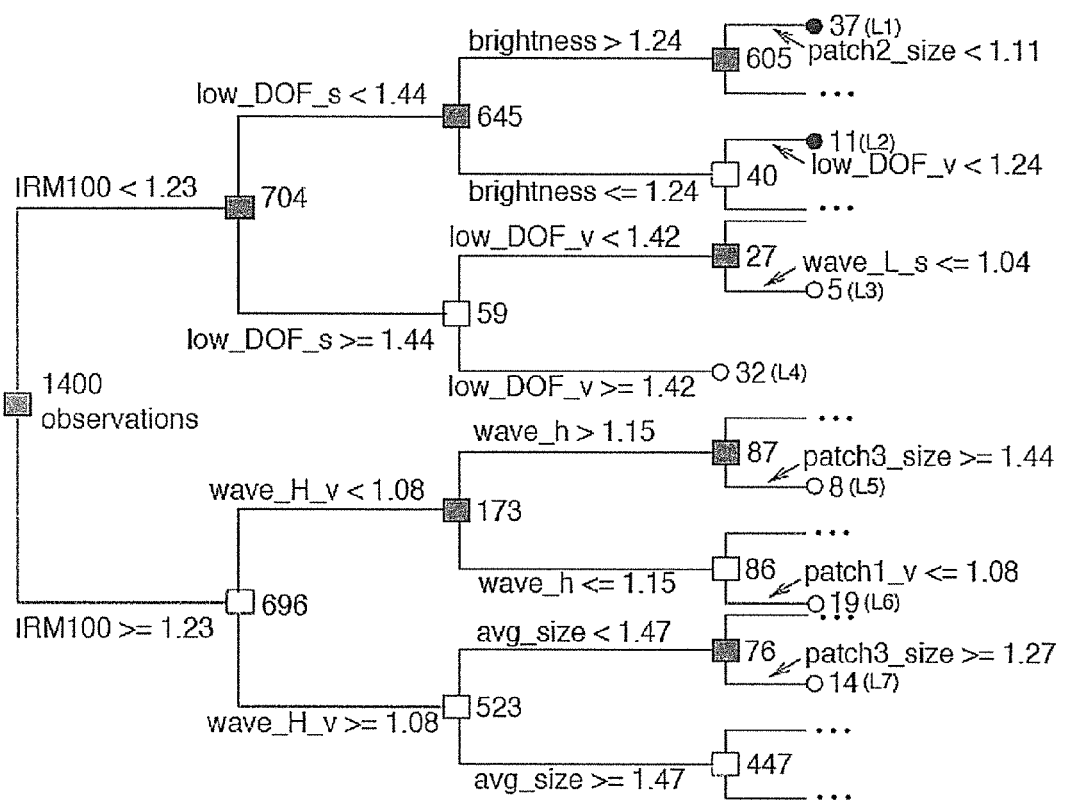
FIG. 8 shows a decision tree obtained using CART and the 56 visual features.
Figure 9:
FIG. 9 shows example images from Photo.net where the consensus aesthetics score≥6 (above), and ≤4 (below), on 1-7.
Figure 10B:
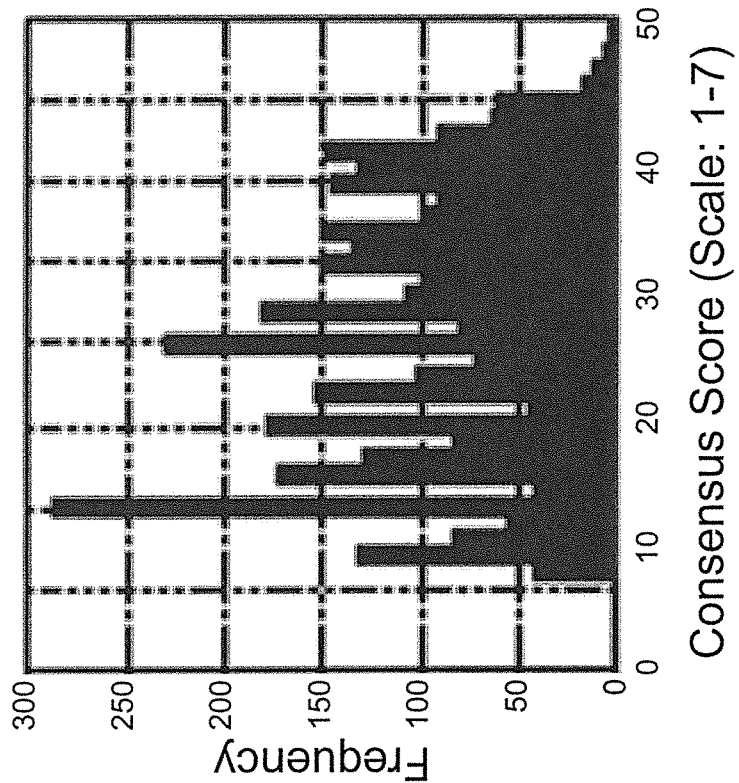
FIG. 10B shows the scores in the Photo.net dataset.
Figure 10A:
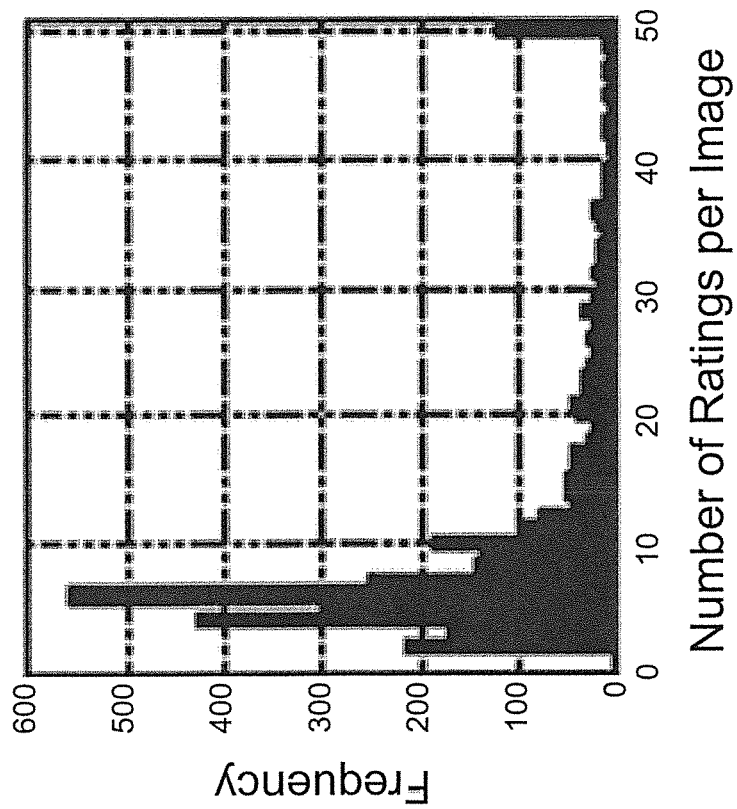
FIG. 10A shows the distributions of number of ratings.
Figure 11A:
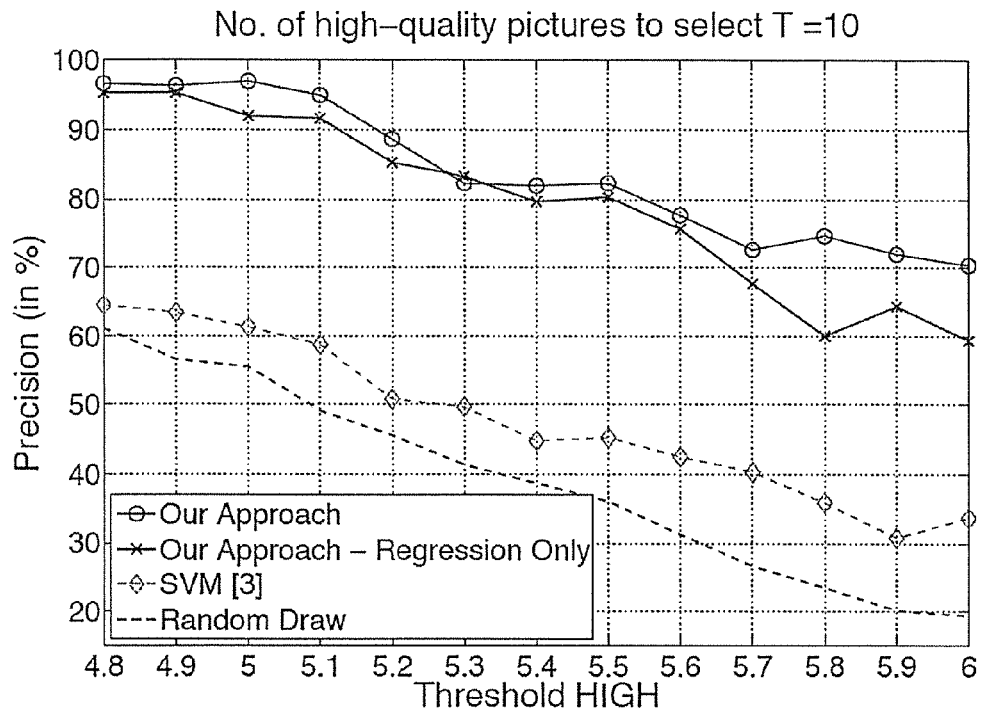
FIGS. 11A-11D show the precision in selecting high-quality images.
Figure 11B:
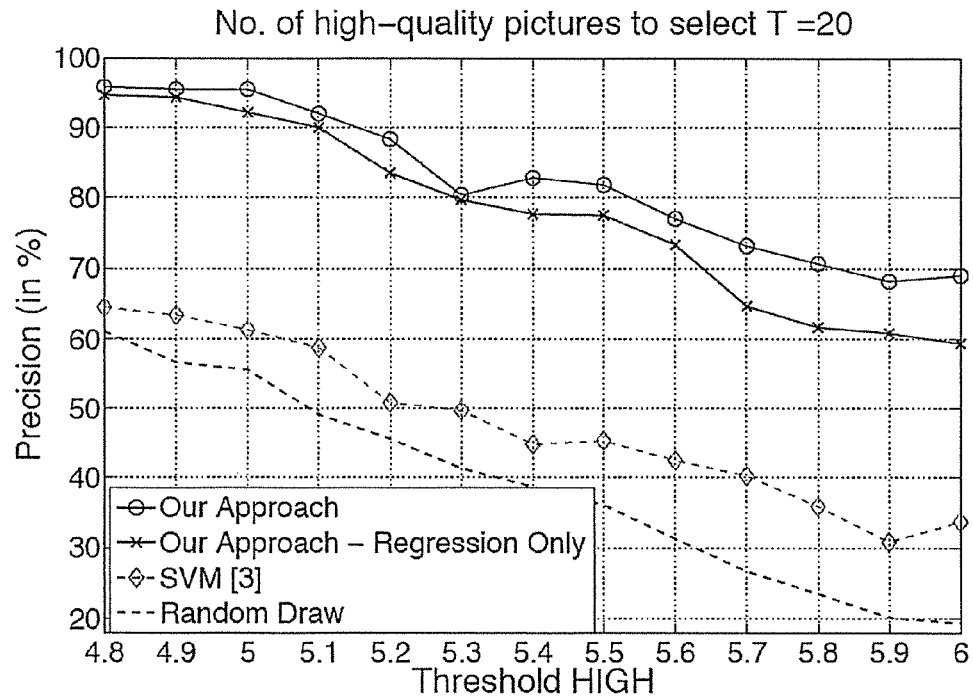
Figure 11C:
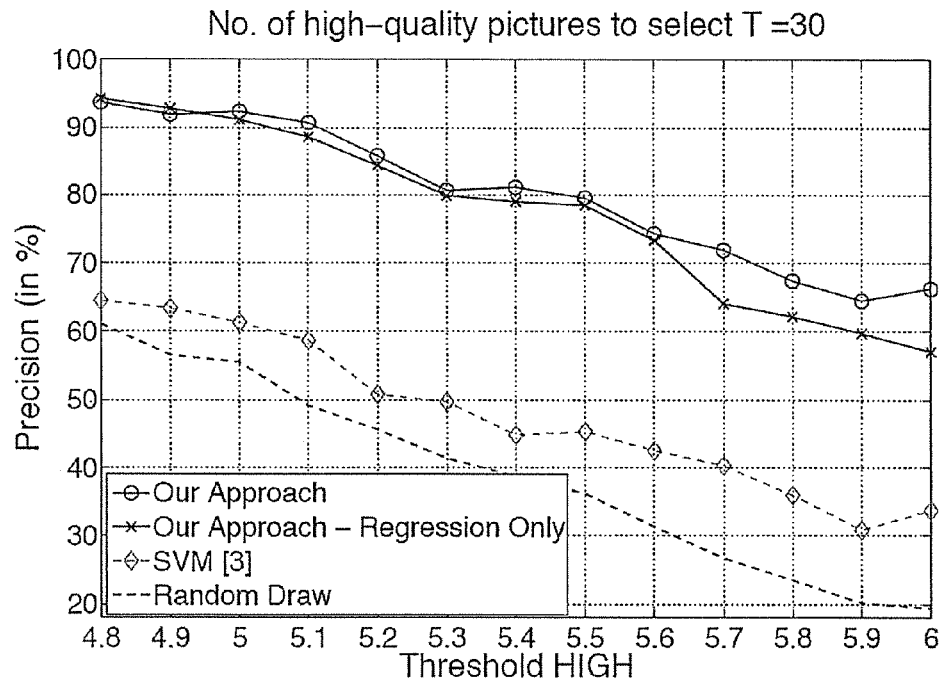
Figure 11D:
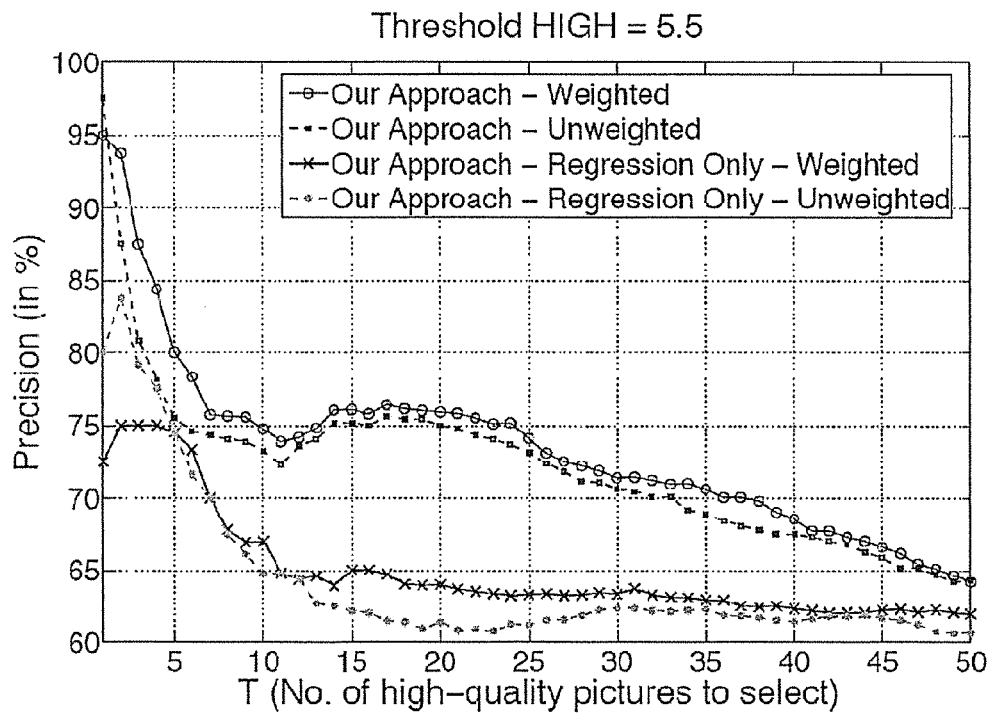
Figure 12:
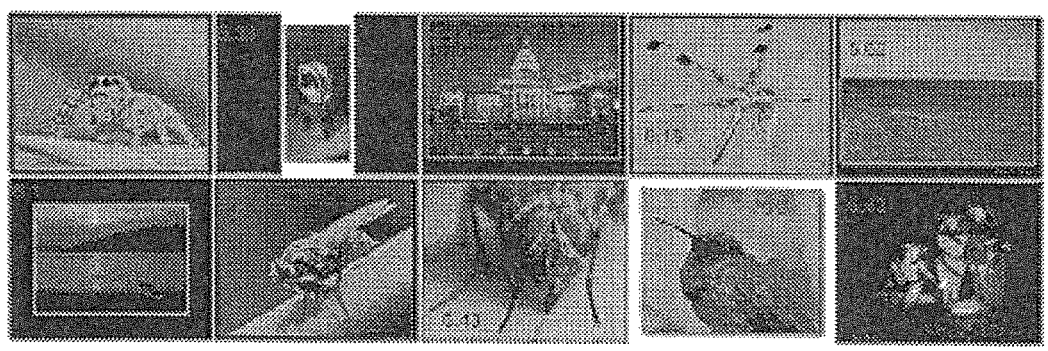
FIG. 12 is a sample instance of T=10 images selected by our approach, for HIGH=5.5.
Figure 13A:
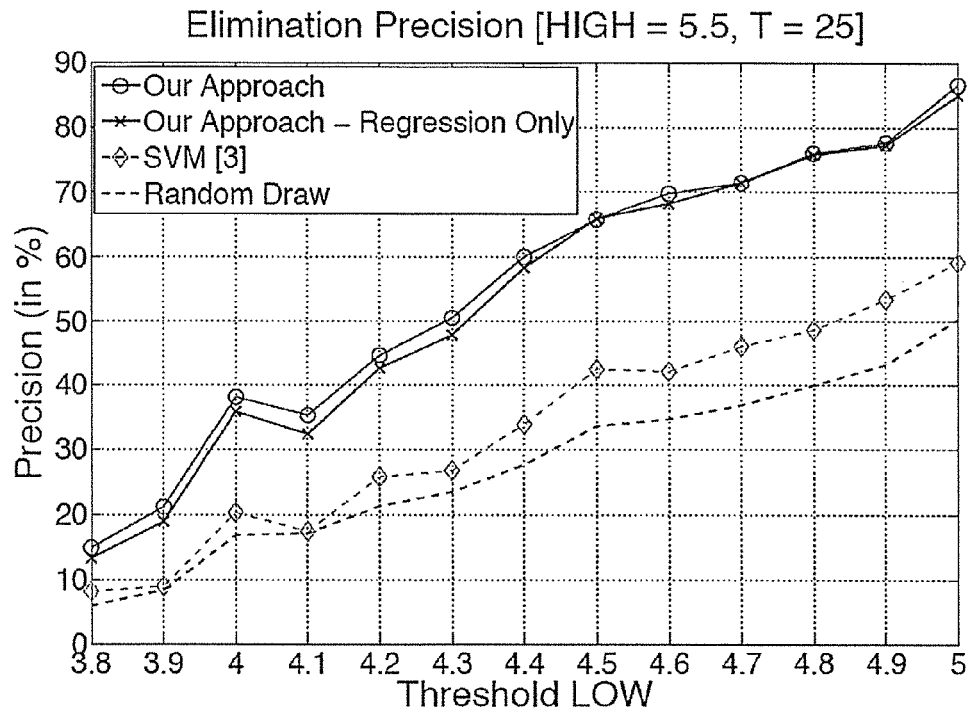
FIGS. 13A-13D show precision in eliminating low-quality images, shown here for two set sizes, namely T=25 and 50.
Figure 13B:
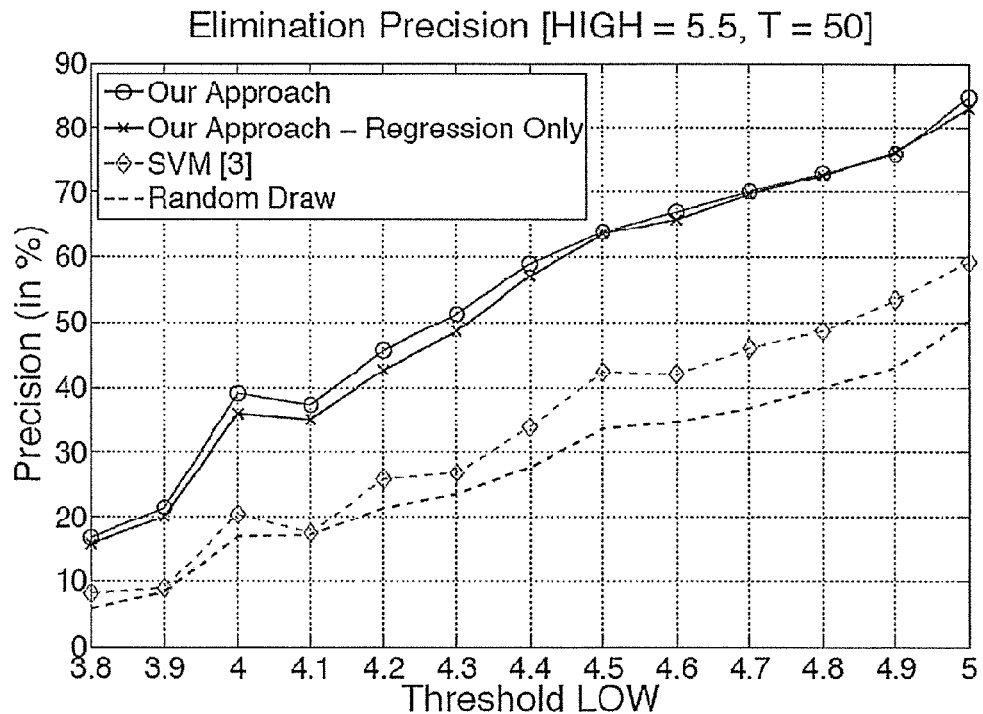
Figure 13C:
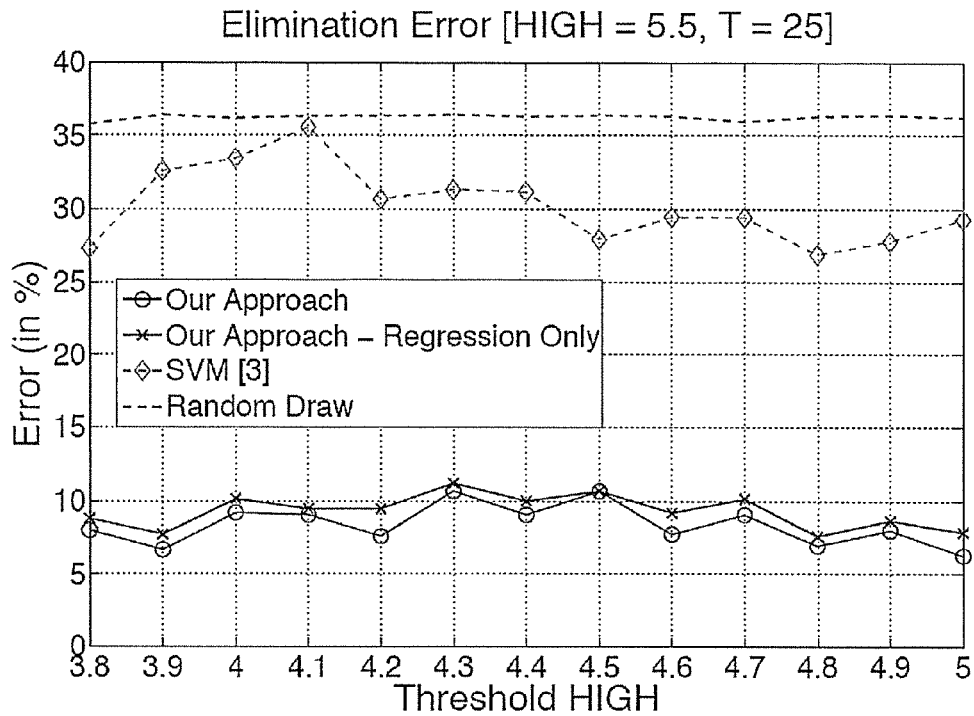
Figure 13D:
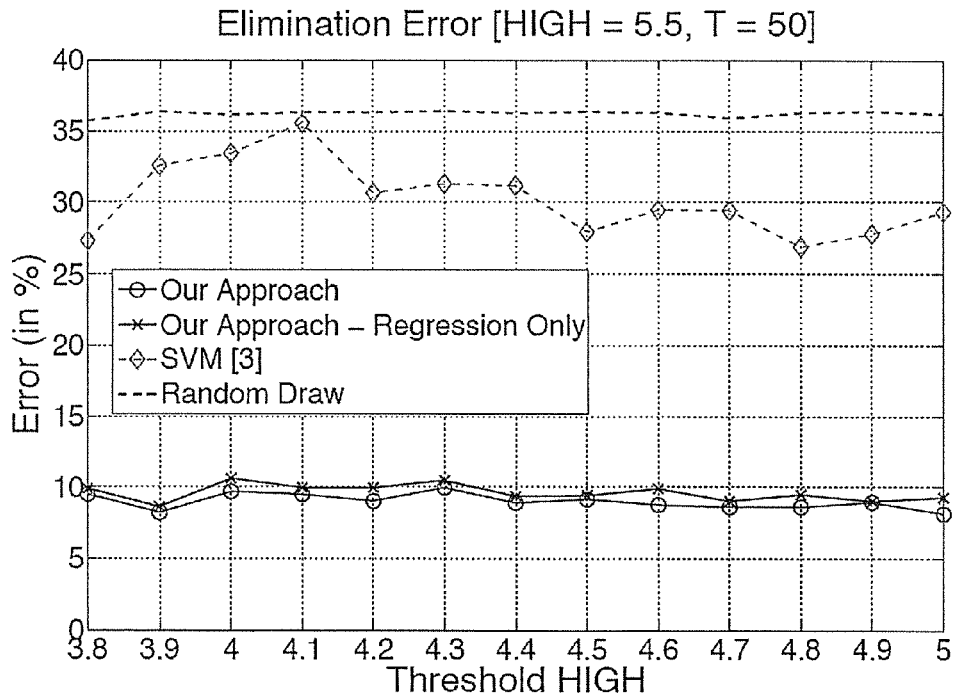
Figure 14:
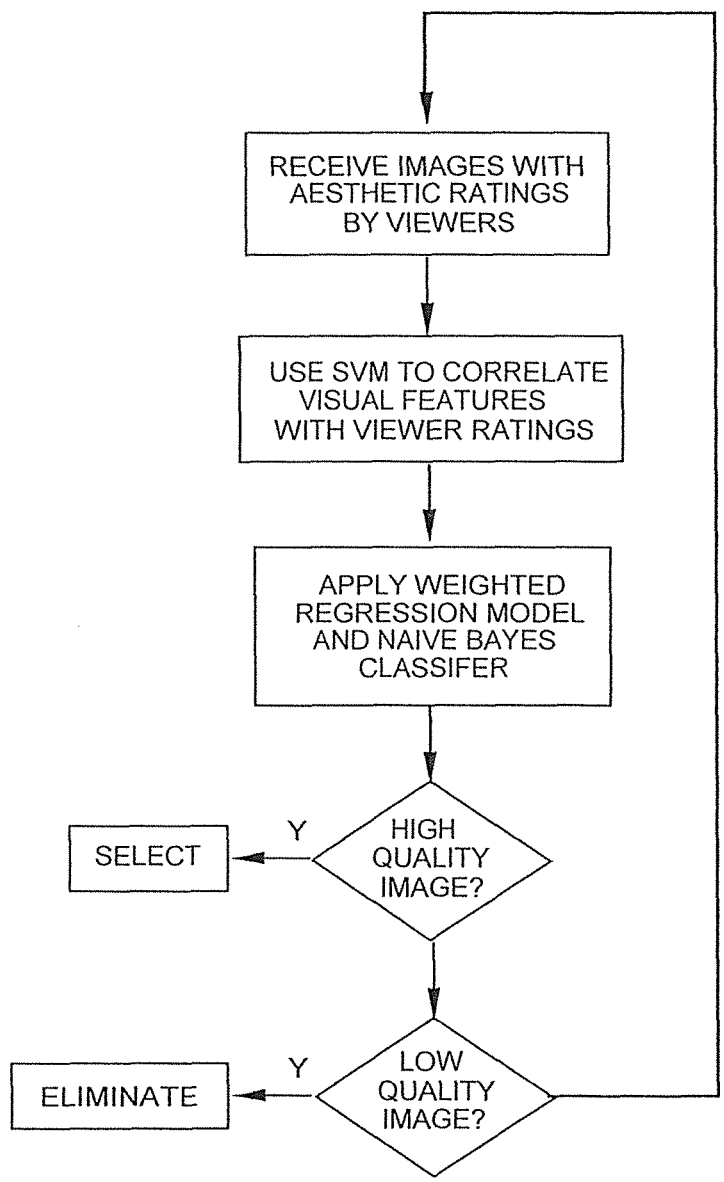
FIG. 14 is a flow diagram that depicts important steps associated with the inventive method.

FIG. 8 shows the CART decision tree obtained using the 56 visual features. In the figures, the decision nodes are denoted by squares while leaf nodes are denoted by circles. The decisions used at each split and the number of observations which fall in each node during the decision process, are also shown in the figures. Shaded nodes have a higher percentage of low class pictures, hence making them low nodes, while un-shaded nodes are those where the dominating class is high.

The RPART implementation uses 5-CV to prune the tree to yield lowest risk. We used a 5-fold cross validation scheme. With complexity parameter governing the tree complexity set to 0.0036, the tree generated 61 splits, yielding an 85.9% model accuracy and a modest 62.3% 5-CV accuracy. More important than the accuracy, the tree provides considerable information on how aesthetics can be related to individual features. Let us discuss some interesting decision paths, in each tree, which support our choice of features. The features denoted by IRM100, i.e. $f_9$, and the low DOF indicators for S and V components, respectively (denoted by low DOF s, i.e. $f_{54}$ and low DOF v $f_{55}$), appear to play crucial roles in the decision process. The expected loss at L3 and L4 are 0% and 9%, respectively. A large numeric value of the low DOF indicators shows that the picture is focused on a central object of interest. As discussed before, taking such pictures requires professional expertise and hence high peer rating is not unexpected. A low value of the feature IRM100 implies that it is visually similar to a large number of other pictures, some of which could be highly rated. This supports the fact that it is not unusual to have high rated pictures representing common concepts, found in many other pictures.

In terms of regression results, the variance $\sigma^2$ of the aesthetics score over the 3581 samples is 0.69. With 5 polynomial terms for each of the 56, we achieved a residual sum-of-squares $R_{res}^2=0.5020$, which is a 28% reduction from the variance $\sigma^2$. This score is not very high, but considering the challenge involved, this does suggest that visual features are able to predict human-rated aesthetics scores with some success. To ensure that this was actually demonstrating some correlation, we randomly permuted the aesthetics scores (breaking the correspondence with the features) and performed the same regression. This time, $R_{res}$ is 0.65, clearly showing that the reduction in expected error was not merely by the over-fitting of a complex model.

Aesthetics-Based Picture Selection

While personal and community-based image collections grow by the day, the demand for novel photo management capabilities grows with it. In accordance with this embodiment, we push aesthetics measurement to more realistic levels, and use it to (a) help select high-quality pictures from collections, and (b) eliminate low-quality ones, introducing appropriate performance metrics in each case. To achieve this, we employ a sequential arrangement of a weighted linear least squares regressor and a naive Bayes' classifier, applied to a set of visual features previously found useful for quality prediction. Experiments on real-world data for these tasks show promising performance, with significant improvements over the SVM-based method.

The immense popularity of photo-sharing communities (e.g., Flickr, Photobucket, Photo.net) and social-networking platforms (e.g., Facebook, Myspace) has made it imperative to introduce novel media management capabilities, which in turn may help to stay competitive in these crowded markets. In the case of visual media management, areas such as content-based image classification and retrieval [28], automatic annotation [22,26], and image watermarking [23] for rights management have been extensively studied. Complementing some of these techniques, our goal is to be able to automatically assess high-level visual quality (unlike low-level quality such as noise/quantization level), so as to facilitate quality-based image management. Among other things, it can help (a) select high-quality images from a collection for browsing, for front-page display, or as representatives, (b) enhance image search by pushing images of higher quality up the ranks, and (c) eliminate low-quality images under space constraints (limited Web space, mobile device, etc.) or otherwise.

Visual quality here can be based on criteria such as aesthetics (Photo.net, see FIG. 1) or interestingness (Flickr), and these can be either personalized (individuals treated separately), or consensus-based (scores averaged over population). A major deterrent to research in this direction has been the difficulty to precisely define their characteristics, and to relate them to low-level visual features. One way around this is to ignore philosophical/psychological aspects, and instead treat the problem as one of data-driven statistical inferencing, similar to user preference modeling in recommender systems [27].

Our work on aesthetics modeling for images has given hope that it may be possible to empirically learn to distinguish between images of low and high aesthetic value. By way of summation, using carefully chosen visual features followed by feature selection, a support vector machine (SVM) can distinguish between images rated >5.8 and <4.2 (on a 1-7 scale) with 70% accuracy and those rated ≥5.0 and <5.0 with 64% accuracy, images being rated publicly by Photo.net users. There are two key concerns in the context of applicability of these results. (1) A 64% accuracy in being able to distinguish (≥5.0,<5.0) is not a strong-enough for real-world deployment in selecting high-quality pictures (if ≥5.0 implies high-quality, that is). (2)

It is unclear how a 70% accuracy on a (>5.8, <4.2) question can be used to help photo management. To address this, we make the following additional contributions: (A) Given a set of visual features known to be useful for visual quality, we propose a new approach to exploiting them for significantly improved accuracy in inferring quality. (B) We introduce a weighted learning procedure to account for the trust we have in each consensus score, in the training data, and empirically show consistent performance improvement with it. (C) We propose two new problems of interest that have direct applicability to image management in real-world settings. Our approach produces promising solutions to these problems.

Let us suppose that there are D visual features known (or hypothesized) to have correlation with visual quality (e.g., aesthetics, interestingness). An image $I_k$ can thus be described by a feature vector $\vec{X_k} \in R^D$, where we use the notation $X_k(d)$ to refer to component d of feature vector $\vec{X_k}$. For clarity of understanding, let us assume that there exists a true measure $q_k$ of consensus on the visual quality that is intrinsic to each $I_k$. Technically, we can think of this true consensus as the asymptotic average over the entire population, i.e., $q_k = \lim_{Q \to \infty} 1/Q \Sigma_{i=1}^{Q} q_{k,i}$, where $q_{k,i}$ is the $i^{th}$ rating received. This essentially formalizes the notion of 'aesthetics in general.' This measurement is expected to be useful to the average user, while for those 'outliers' whose tastes differ considerably from the average, a personalized score is more useful—a case that best motivates recommender systems with individual user models.

In reality, it is impractical to compute this true consensus score because it requires feedback over the entire population. Instead, items are typically scored by a small subset of the population, and what we get from averaging over this subset is an estimator for $q_k$. If $\{s_{k,1}, \ldots, s_{k,nk}\}$ is a set of scores provided by $n_k$ unique users for $I_k$, then $q_k = 1/n_k \Sigma_{i=1}^{n_k} s_{k,i}$, where $q_k$ is an estimator of $q_k$. In theory, as $n_k \to \infty$, $q_k \to q_k$. Given a set of N training instances $\{(\vec{X_1}, q_1), \ldots, (\vec{X_N}, q_N)\}$, our goal is to learn a model that can help predict quality from the content of unseen images.

Weighted Least Squares Regression

Regression is a direct attempt at learning to emulate human ratings of visual quality. Here, we follow the past work by learning a least squares linear regressor on the predictor variables $X_k(1), \ldots, X_k(D)$, where the dependent variable is the consensus score $q_k$. We introduce weights to the regression process on account of the fact that $q_k$ are only estimates of the true consensus $q_k$, with less precise estimates being less trustable for learning tasks. From classical statistics, we know that the standard error of mean, given by $\sigma/\sqrt{n}$, decreases with increasing sample size n. Since $q_k$ is a mean estimator, we compute the weights $w_k$ as a simple increasing function of sample size $n_k$, $$w_k = \frac{n_k}{n_k + 1}, k = 1, \ldots, N$$

where $\lim_{n_k \to \infty} w_k = 1$, $w_k \in [1/2, 1)$. The corresponding parameter estimate for squared loss is written as $$\vec{\beta}^* = \underset{\vec{\beta}}{\operatorname{argmin}} \frac{1}{N} \sum_{k=1}^{N} w_k \left( \hat{q}_k - \left( \beta(0) + \sum_{d=1}^{D} \beta(d) X_k(d) \right) \right)^2$$

Given a $\vec{\beta}^*$ estimated from training data, the predicted score for an unseen image I having feature vector X is given by $$q^{pred} = \beta*(0) + \sum_{d=1}^{D} \beta(d) X(d) \quad (2)$$

Because weighted regression is relatively less popular than its unweighted counterpart, we briefly state an elegant and efficient linear algebraic [4] estimation procedure, for the sake of completeness. Let us construct an N×(D+1) matrix $X=[\vec{1} \: Z^T]$ where $\vec{1}$ is a N-component vector of ones, and $Z=[\vec{X}_1 \ldots \vec{X}_N]$. Let $\vec{q}$ be a N×1 column matrix (or vector) of the form $(q_1 \ldots q_N)^T$, and W is an N×N diagonal matrix consisting of the weights, i.e., $W=\text{diag}\{w_1, \ldots, w_N\}$. In the unweighted case of linear regression, the parameter estimate is given by $\vec{\beta}^* = (X^T X)^{-1} X^T \vec{q} = X^\dagger \vec{q}$, where $X^\dagger$ is the pseudoinverse in the case of linearly independent columns. The weighted linear least squares regression parameter set, on the other hand, is estimated as below:

$$\vec{\beta}^* = (X^T W X)^{-1} X^T W \vec{q} \quad (3)$$

Letting $V = \text{diag}\{\sqrt{w_1}, \ldots, \sqrt{w_N}\}$, such that $W = V^T V = V V^T$, we can re-write Eq. 3 in terms of pseudoinverse:

$$\begin{aligned} \vec{\beta}^* &= (X^T W X)^{-1} X^T W \vec{q} \\ &= ((VX)^T (VX))^{-1} (VX)^T V \vec{q} \\ &= (VX)^+ V \vec{q} \end{aligned} \quad (4)$$

This form may lead to cost benefits. Note that the weighted learning process does not alter the inference step of Eq. 2.

Naive Bayes' Classification

The motivation for having a naive Bayes' classifier was to be able to complement the linear model with a probabilistic one, based on the hypothesis that they have non-overlapping performance advantages. The particular way of fusing regression and classification will become clearer shortly. For this, we assume that by some predetermined threshold, the (consensus) visual quality scores $q_k$ can be mapped to binary variables $\hat{h}_k \in \{-1, +1\}$. For simplification, we make a conditional independence assumption on each feature given the class, to get the following form of the naive Bayes' classifier:

$$Pr\left(H \mid X(1), \ldots, X(D)\right) \alpha Pr(H) \prod_{d=1}^{D} Pr(X(d) \mid H) \quad (5)$$

The inference for an image $I_k$ with features $\vec{X_k}$ involves a simple comparison of the form:

$$\hat{h}_k = \arg \max_{h \in \{-1, +1\}} Pr(H = h) \prod_{d=1}^{D} Pr(X_k(d) \mid H = h) \quad (6)$$

The training process involves estimating Pr(H) and Pr(X(d) |H) for each d. The former is estimated as follows:

$$Pr(H = h) = \frac{1}{N} \sum_{i=1}^{N} I(\hat{h}_i = h) \quad (7)$$

where $I(\bullet)$ is the indicator function. For the latter, parametric distributions are estimated for each feature d given class. While Gaussian mixture models seem appropriate for complicated feature values (e.g., too high or too low brightness are both not preferred), here we model each of them using single component Gaussian distributions, i.e., $$X(d) \mid (H = h) \sim \mathcal{N}(\mu_{d,h}, \sigma_{d,h}), \forall d, h, \quad (8)$$

where the Gaussian parameters $\mu_{d,h}$ and $\sigma_{d,h}$ are the mean and std. dev. of the feature value $X_d$ over those training samples k that have $\hat{h}_k = h$. Performing weighted parameter estimation is possible here too, although in our experiments we restricted weighting learning to regression only.

Selecting High-Quality Pictures

Equipped with the above two methods, we are now ready to describe our approach to selecting high-quality images. First we need a definition for 'high-quality'. An image $I_k$ is considered to be visually of high-quality if its estimated consensus score, as determined by a subset of the population, exceeds a predetermined threshold, i.e., $q_k \geq \text{HIGH}$. Now, the task is to automatically select T high-quality images out of a collection of N images. Clearly, this problem is no longer one of classification, but that of retrieval. The goal is to have high precision in retrieving pictures, such that a large percentage of the T pictures selected are of high-quality. To achieve this, we perform the following:

1. A weighted regression model (discussed above) is learned on the training data.
2. A naive Bayes' classifier (discussed above) is learned on training data, where the class labels $\hat{h}_k$ are defined as $$\hat{h}_k = \begin{cases} +1 & \text{if } \hat{q}_k \geq \text{HIGH} \\ -1 & \text{if } \hat{q}_k < \text{HIGH} \end{cases}$$

3. Given an unseen set of N test images, we get predict consensus scores $\{q_1, \ldots, q_N\}$ using the weighted regression model, which we sort in descending order.
4. Using the naive Bayes' classifier, we start from the top of the ranklist, selecting images for which the predicted class is +1, i.e., $\hat{h} = +1$, and $Pr(H=+1 \mid X(1), \ldots, X(D))/Pr(H=-1 \mid X(1), \ldots, X(D)) > \theta$, until T of them have been selected. This filter applied to the ranked list therefore requires that only those images at the top of the ranked list that are also classified as high-quality by the naive Bayes' (and convincingly so) are allowed to pass. For our experiments, we chose θ=5 arbitrarily and got satisfactory results.

Eliminating Low-Quality Pictures

Here, we first need to define low-quality. An image $I_k$ is considered to be visually of low-quality if its consensus score is below a threshold, i.e., $q_k \leq$ LOW. Again, the task is to automatically filter out T low-quality images out of a collection of N images, as part of a space-saving strategy (e.g., presented to the user for deletion). The goal is to have high precision in eliminating low-quality pictures, with the added requirement that as few high-quality ones (defined by threshold HIGH) be eliminated in the process as possible. Thus, we wish to eliminate as many images having score≤LOW as possible, while keeping those with score≥HIGH low in count. Here, steps 1 and 2 of the procedure are same as before, while steps 3 and 4 differ as follows:

1. In Step 3, instead of sorting the predicted consensus scores in descending order, we do so in ascending order.
2. In Step 4, we start from the top of the ranklist, selecting images for which the predicted class is −1 (not +1, as before), by a margin. This acts as a two-fold filter: (a) low values for the regressed score ensure preference toward selecting low-quality pictures, and (b) a predicted class of −1 by the naive Bayes' classifier prevents those with HIGH scores from being eliminated.

Experiments

All experiments were performed on the same dataset obtained from Photo.net that was used in [24], consisting of 3581 images, each rated publicly by one or more Photo.net users on a 1-7 scale, on two parameters, (a) aesthetics, and (b) originality. As before, we use the aesthetics score as a measure of quality. While individual scores are unavailable, we do have the average scores $q_k$ for each image $I_k$, and the no. of ratings $n_k$ given to it. The score distribution in the 1-7 range, along with the distribution of the per-image number of ratings, is presented in FIG. 2. Note that the lowest average score given to an image is 3.55, and that the number of ratings has a heavy-tailed distribution. The same 56 visual features extracted in [24] (which include measures for brightness, contrast, depth-of-field, saturation, shape convexity, region composition, etc.) are used here as well, but without any feature selection being performed. Furthermore, nonlinear powers of each of these features, namely their squares, cubes, and square-roots, are augmented with them to get D=224 dimensional feature vectors describing each image.

Selecting High-Quality Pictures

Using the procedure described above, we perform experiments for selection of high-quality images for different values of HIGH, ranging over 4.8-6.0 out of a possible 7, in intervals of 0.1. In each case, 1000 images are drawn uniformly at random from the 3581 images for testing, and the remaining are used for training the regressor and the classifier. The task here is to select T=5, 10, and 20 images out of the pool of 1000 (other values of T≤50 showed similar trends), and measure the precision=#(high-quality images selected)/#(images selected), where the denominator is a chosen T. We compare our approach with three baselines. First, we use only the regressor and not the subsequent classifier (named 'Regression only'). Next we use an SVM, as described herein, to do a (<HIGH, ≥HIGH) classification to get a fixed performance independent of T (named 'SVM'), i.e., the SVM simply classifies each test image, and therefore regardless of the number of images (T) to select, performance is always the same. Finally, as a worst-case bound on performance, we plot the precision achieved on picking any T images at random (named 'Random Draw'). This is also an indicator of the proportion of the 1000 test images that actually are of high-quality on an average. Each plot in FIG. 3 are averages over 50 random test sets.

We notice that our performance far exceeds that of the baselines, and that combining the regressor with the naive Bayes' in series pushes performance further, especially for larger values of HIGH (since the naive Bayes' classifier tends to identify high-quality pictures more precisely). For example, when HIGH is set to 5.5, and T=20 images are selected, on an average 82% are of high-quality when our approach is employed, in contrast to less than 50% using SVMs. For lower thresholds, the accuracy exceeds 95%. In the fourth graph (bottom-right), we note the improvement achieved by performing weighted regression instead of giving every sample equal importance. Performed over a range of HIGH values, these averaged results confirm our hypothesis about the role of 'confidence' in consensus modeling. For illustration, we present a sample instance of images selected by our approach for T=10 and HIGH=5.5, in FIGS. 4A-4D, along with their ground-truth consensus scores.

Eliminating Low-Quality Pictures

Here the goal is to be able to eliminate T images such that a large fraction of them are of low-quality (defined by threshold LOW) while as few as possible images of high-quality (defined by threshold HIGH) get eliminated alongside. Experimental setup is same as the previous case, with 50 random test sets of 1000 images each. We experimented with various values of T≤50 with consistent performance. Here we present the cases of T=25 and 50, fix HIGH=5.5, while varying LOW from 3.8-5.0. Along with the metric precision=#(low-quality images eliminated)/#(images eliminated), also computed in this case is error=#(high-quality images eliminated)/#(images eliminated). Measurements over both these metrics, with varying LOW threshold, and in comparison with the 'Regression Only', 'SVM', and 'Random Draw', are presented in FIG. 5.

These results are very encouraging, as before. For example, it can be seen that when the threshold for low-quality is set to 4.5, and 50 images are chosen for elimination, our approach ensures ~65% of them to be of low-quality, with only ~9% to be of high-quality. At higher threshold values, precision exceeds 75%, while error remains roughly the same. In contrast, the corresponding SVM figures are 43% and 28% respectively. We also note that the performance with using naive Bayes' in conjunction with regression does improve performance on both metrics, although not to the extent we see in high-quality picture selection. While not shown here, we found similar improvements as before with using the weighted methods over the unweighted ones. In general, our approach produces lesser guarantees in elimination of low-quality than selection of high-quality.

CONCLUSIONS

In this specification, we have established significant correlation between various visual properties of photographic images and their aesthetics ratings. We have shown, through using a community-based database and ratings, that certain visual properties tend to yield better discrimination of aesthetic quality than some others. Our SVM based classifier is able to produce good accuracy using only 15 visual features in separating high and low rated photographs.

In the process of designing the classifier, we have developed a number of new features relevant to photographic quality, including a low depth-of-field indicator, a colorfulness measure, a shape convexity score and a familiarity measure.

Even though a number of extracted features hypothesized to be having good correlation with aesthetics did not show significant correlation, they potentially have applications in other photographic image analysis work as they are sound formulations of basic principles in photographic art. The accuracy rate using visual features can potentially be improved by incorporating new features like dominant lines, converging lines, light source classification, and subject-background relationships. Yet, one of the biggest hurdles remain the lack of a reliable algorithm for semantic understanding of images, which, until surpassed, will continue to keep the accuracy rate of any such system from touching the 100% mark.

We have also presented a simple approach to selecting high-quality images and eliminating low-quality ones from image collections, quality being defined by population consensus. Experiments show vast improvement over a previously proposed SVM-based approach. It is found that the same visual features proposed in [24] can show much more promising results when exploited by a different approach. Weighting the training data by confidence levels in the consensus scores is also found to consistently improve performance. The key to this success lies not necessarily in a better classifier, but in the fact that for these problems, it suffices to identify the extremes in visual quality, for a subset of the images, accurately.

REFERENCES

[1] Airlines.Net, http://www.airliners.net.
[2] R. Arnheim, *Art and Visual Perception: A Psychology of the Creative Eye*, University of California Press, Berkeley, 1974.
[3] ARTStor.org, http://www.artstor.org.
[4] K. Barnard, P. Duygulu, D. Forsyth, N.-de. Freitas, D. M. Blei, and M. I. Jordan, "Matching Words and Pictures," *J. Machine Learning Research*, 3:1107-1135, 2003.
[5] A. L. Blum and P. Langley, "Selection of Relevant Features and Examples in Machine Learning," *Artificial Intelligence*, 97(1-2):245-271, 1997.
[6] C. Carson, S. Belongie, H. Greenspan, and J. Malik, "Blobworld: Color and Texture-Based Image Segmentation using EM and its Application to Image Querying and Classification," *IEEE Trans. on Pattern Analysis and Machine Intelli.*, 24(8):1026-1038, 2002.
[7] C-c. Chen, H. Wactlar, J. Z. Wang, and K. Kiernan, "Digital Imagery for Significant Cultural and Historical Materials—An Emerging Research Field Bridging People, Culture, and Technologies," *Int'l J. on Digital Libraries*, 5(4): 275-286, 2005.
[8] L. Breiman, J. H. Friedman, R. A. Olshen, and C. J. Stone, *Classification and Regression Trees*, Wadsworth, Belmont, Calif., 1983.
[9] C.-c. Chang, C.-j. Lin, "LIBSVM: A Library for SVM", http://www.csie.ntu.edu.tw/~cjlin/libsvm, 2001.
[10] I. Daubechies, *Ten Lectures on Wavelets*, Philadelphia, SIAM, 1992.
[11] Flickr, http://www.flickr.com.
[12] J. Li and J. Z. Wang, "Automatic Linguistic Indexing of Pictures by a Statistical Modeling Approach," *IEEE Trans. on Pattern Analysis and Machine Intelli.*, 25(9):1075-1088, 2003.
[13] W. Y. Ma and B. S. Manjunath, "NeTra: A Toolbox for Navigating Large Image Databases," *Multimedia Systems*, 7(3):184-198, 1999.
[14] B. S. Manjunath, W. Y. Ma, "Texture Features for Browsing and Retrieval of Image Data", *IEEE Trans. on Pattern Analysis and Machine Intelli.*, 18(8):837-842, 1996.
[15] Photo.Net, http://www.photo.net.
[16] Photo.Net Rating System, http://photo.net/gallery/photocritique/standards.
[17] Y. Rubner, C. Tomasi, L. J. Guibas, "The Earth Mover's Distance as a Metric for Image Retrieval," *Int'l. J. Computer Vision*, 4(2):99-121, 2000.
[18] A. W. Smeulders, M. Worring, S. Santini, A. Gupta, and R. Jain, "Content-Based Image Retrieval at the End of the Early Years," *IEEE Trans. on Pattern Analysis and Machine Intelli.*, 22(12):1349-1380, 2000.
[19] T. M. Therneau and E. J. Atkinson, "An Introduction to Recursive Partitioning Using RPART Routines," *Technical Report, Mayo Foundation*, 1997.
[20] V. Vapnik, *The Nature of Statistical Learning Theory*, Springer, 1995.
[21] J. Z. Wang, J. Li, and G. Wiederhold, "SIMPLIcity: Semantics-Sensitive Integrated Matching for Picture Libraries," *IEEE Trans. on Pattern Analysis and Machine Intelli.*, 23(9):947-963, 2001.
[22] C. Carson, S. Belongie, H. Greenspan, and J. Malik. Blobworld: Image segmentation using expectation-maximization and its application to image querying. *IEEE Trans. Pattern Analysis and Machine Intelligence*, 24(8): 1026-1038, 2002.
[23] I. Cox, J. Kilian, F. Leighton, and T. Shamoon. Secure spread spectrum watermarking for multimedia. *IEEE Trans. Image Processing*, 6(12):1673-1687, 1997.
[24] R. Datta, D. Joshi, J. Li, and J. Z. Wang. Studying aesthetics in photographic images using a computational approach. In *Proc. ECCV*, 2006.
[25] G. H. Golub and C. F. V. Loan. *Matrix Computations*. Johns Hopkins University Press, Baltimore, Md., 1983.
[26] J. Li and J. Z. Wang. Automatic linguistic indexing of pictures by a statistical modeling approach. *IEEE Trans. Pattern Analysis and Machine Intelligence*, 25(9):1075-1088, 2003.
[27] P. Resnick and H. Varian. Recommender systems. *Comm. of the ACM*, 40(3):56-58, 1997.
[28] A. W. Smeulders, M. Worring, S. Santini, A. Gupta, and R. Jain. Content-based image retrieval at the end of the early years. *IEEE Trans. Pattern Analysis and Machine Intelligence*, 22(12):1349-1380, 2000.

We claim:
1. A computer-based method of inferring and utilizing aesthetic quality of photographs and other images, comprising the steps of:
receiving a plurality of digitized images along with aesthetic-based ratings of the images;
performing one or more software operations on the digitized images to automatically extract a plurality of visual features representative of each image;
receiving an image without an aesthetic-based rating;
automatically extracting a plurality of visual features representative of the received image;
computing a familiarity measure for the received image by correlating the visual features extracted from the received image to the visual features extracted from the other images;
determining an aesthetic-based rating for the received image on the basis of the familiarity measure, wherein a lower familiarity is indicative of originality and a higher rating; and
using one or more statistical methods to correlate the extracted visual features and the aesthetic-based ratings to classify the images on the basis of aesthetic value, rate the images on a scale relating to aesthetics value, or select/eliminate an image based upon aesthetic quality.

2. The method of claim 1, wherein the correlation is performed using a support vector machine.

3. The method of claim 1, further including the step of converting each image into the HSV color space to produce two-dimensional matrices IH, IS and IV for feature extraction.

4. The method of claim 1, further including the step of automatically segmenting each image to identify objects in the image.

5. The method of claim 1, wherein one of the plurality of features is color distribution.

6. The method of claim 1, further including the step of performing a linear regression on one or more of the features to infer the aesthetic-based rating for the received image.

7. The method of claim 1, further including the use of a naïve Bayes classifier to classify the image based on aesthetic-based rating.

8. The method of claim 1, wherein linear regression and naïve Bayes classification methods are used in conjunction to select high-quality images or eliminate low-quality images from an image collection.

9. The method of claim 1, wherein the step of extracting a plurality of visual features representative of each image includes the employment of a content-based image retrieval algorithm.

* * * * *